US012506245B1

(12) United States Patent
Shea et al.

(10) Patent No.: US 12,506,245 B1

(45) Date of Patent: Dec. 23, 2025

(54) RADIAL POWER COMBINER

(71) Applicant: Cobham Advanced Electronic Solutions Inc., Arlington, VA (US)

(72) Inventors: Ed Shea, Methuen, MA (US); Mark Wonson, Gloucester, MA (US)

(73) Assignee: FRONTGRADE TECHNOLOGIES INC., Colorado Springs, CO (US)

( * ) Notice: Subject to any disclaimer, the term of this patent is extended or adjusted under 35 U.S.C. 154(b) by 494 days.

(21) Appl. No.: 17/886,576

(22) Filed: Aug. 12, 2022

(51) Int. Cl.
*H01P 5/12* (2006.01)
*H01P 1/02* (2006.01)
*H01P 5/02* (2006.01)
*H01P 5/08* (2006.01)
*H01P 5/22* (2006.01)

(52) U.S. Cl.
CPC .................. *H01P 5/22* (2013.01); *H01P 1/02* (2013.01); *H01P 5/02* (2013.01); *H01P 5/082* (2013.01); *H01P 5/12* (2013.01)

(58) Field of Classification Search
CPC .... H01P 5/00; H01P 5/02; H01P 5/022; H01P 5/024; H01P 5/082; H01P 5/12; H01P 5/16; H01P 1/042; H01P 3/12
See application file for complete search history.

(56) References Cited

U.S. PATENT DOCUMENTS 4,590,446 A 5/1986 Hsu et al.
6,097,266 A 8/2000 Nardozza et al.
6,323,742 B1 11/2001 Ke
9,065,163 B1 6/2015 Wu
10,164,667 B1 12/2018 Kitt
11,764,454 B1 9/2023 Podell
11,949,392 B1 4/2024 Delisio, Jr
2005/0174194 A1 8/2005 Wu
2019/0089032 A1 3/2019 Otsuki

FOREIGN PATENT DOCUMENTS

CN 202254559 U 5/2012
CN 114039184 A 2/2022

OTHER PUBLICATIONS

Translation of CN114039184A , Feb. 22, 2022.*

* cited by examiner

*Primary Examiner* — Stephen E. Jones
(74) *Attorney, Agent, or Firm* — ALSTON & BIRD LLP

(57) ABSTRACT

Power combiners and associated methods of manufacturing are provided. An example power combiner includes a plurality of power input structures each of which defines a waveguide that receives a respective electromagnetic radiation input from a respective power source and a central combining conduit. The central combining conduit receives the respective electromagnetic radiation inputs communicated via respective power input structures and combines the respective electromagnetic radiation inputs into a combined power signal for output via an output port communicably coupled with the central combining conduit. The central combining conduit defines a waveguide structure that is configured to minimize insertion loss between the respective electromagnetic radiation inputs and the combined power signal. The central combining conduit may combine the electromagnetic radiation inputs in the absence of a tuning element and may reduce or substantially prevent back reflection of the electromagnetic radiation inputs received from the plurality of power input structures.

20 Claims, 9 Drawing Sheets

RADIAL POWER COMBINER

TECHNOLOGICAL FIELD

Example embodiments, of the present disclosure relate generally to devices used with electromagnetic radiation and, more particularly, to devices for improved power aggregation.

BACKGROUND

Electromagnetic radiation (e.g., radio waves, microwaves, etc.) is used in a variety of applications, such as radio and television broadcasting, wireless networking, satellite communication, navigation, military applications, and the like, in which radio waves (e.g., electromagnetic radiation) are used to transmit information (e.g., data) across space. By way of example, radio communication may be used in navigation or RADAR (Radio Detection and Ranging) applications to determine the relative position of objects in space. To aggregate, group, or otherwise combine radiofrequency (RF) radiation, energy, or signals, power combiners may be used. The inventors have identified numerous deficiencies with these existing technologies in the field, the remedies for which are the subject of the embodiments described herein.

BRIEF SUMMARY

Embodiments of the present invention provide a power combiner including a plurality of power input structures, wherein each of the plurality of power input structures defines a waveguide configured to receive a respective electromagnetic radiation input from a respective power source; and a central combining conduit configured to receive the respective electromagnetic radiation inputs communicated via respective power input structures; and combine the respective electromagnetic radiation inputs into a combined power signal for output via an output port communicably coupled with the central combining conduit, wherein the central combining conduit defines a waveguide structure that is configured to minimize insertion loss between the respective electromagnetic radiation inputs and the combined power signal. Each of the plurality of power input structures of such a power combiner may comprise a body defining a first end configured to receive the respective electromagnetic radiation input from the respective power source; a second end opposite the first end configured to couple the respective power input structure to the central combining conduit; and the waveguide extending therebetween. Each of the plurality of power input structures may taper along a length of the respective body from the first end to the second end. Each of the plurality of power input structures may define a first cross-sectional area proximate the first end and a second cross-sectional area proximate the second end, wherein the first cross-sectional area is greater than the second cross-sectional area. A power combiner may further comprise a plurality of solid-state power inputs, each of which is coupled to a respective one of the plurality of power input structures. Each of the plurality of solid-state power inputs may be removably attached to respective first ends of the respective power input structures. The central combining conduit may be dimensioned so as to reduce or substantially prevent back reflection of the electromagnetic radiation inputs received from the plurality of power input structures. The central combining conduit may define a circular cross-sectional shape such that each of the power input structures are positioned circumferentially around the central combining conduit and extend radially outward from the central combining conduit. A diameter of the central combining conduit may be configured to reduce or substantially prevent back reflection of the electromagnetic radiation inputs received from the plurality of power input structures. The electromagnetic radiation inputs received from the plurality of power input structures may move through the central combining conduit substantially unimpeded. The central combining conduit may consist of the waveguide structure. The central combining conduit may combine the electromagnetic radiation inputs in the absence of a tuning element. The plurality of power input structures may be formed integral to the central combining conduit. A bandwidth of the combined power signal output by the power combiner 100 may be at least 16% of the sum of a parameter bandwidth of the electromagnetic radiation inputs.

Embodiments of the present invention also provide a method of manufacturing a power combiner, the method including providing a plurality of power input structures, wherein each of the plurality of power input structures defines a waveguide configured to receive a respective electromagnetic radiation input from a respective power source; and providing a central combining conduit configured to receive the respective electromagnetic radiation inputs communicated via respective power input structures; and combine the respective electromagnetic radiation inputs into a combined power signal for output via an output port communicably coupled with the central combining conduit, wherein the central combining conduit defines a waveguide structure that is configured to minimize insertion loss between the respective electromagnetic radiation inputs and the combined power signal. Providing the central combining conduit may further comprise dimensioning the central combining conduit so as to reduce or substantially prevent back reflection of the electromagnetic radiation inputs received from the plurality of power input structures. Providing the central combining conduit may further comprise defining a circular cross-sectional shape of the central combining conduit such that each of the power input structures are positioned circumferentially around the central combining conduit and extend radially outward from the central combining conduit. A diameter of the central combining conduit may be configured to reduce or substantially prevent back reflection of the electromagnetic radiation inputs received from the plurality of power input structures. The electromagnetic radiation inputs received from the plurality of power input structures may move through the central combining conduit substantially unimpeded. The central combining conduit may combine the electromagnetic radiation inputs in the absence of a tuning element.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
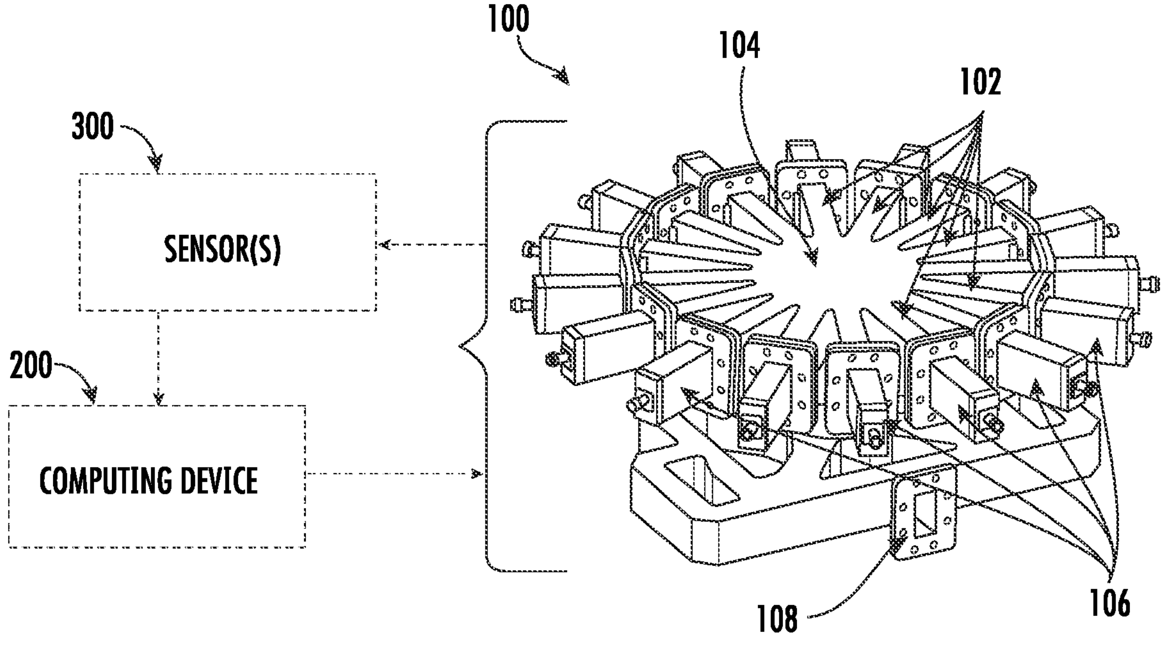
FIG. 1 illustrates a perspective view of an example power combiner of the present disclosure with attached power sources in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "communication" may be selectively used to describe or otherwise define the conduit, waveguide, etc. by which electromagnetic radiation (e.g., radio signals or the like) may propagate. By way of example, the power input structures and/or central combining conduit of the present disclosure may define a channel, conduit, opening, or the like at least partially bounded, enclosed, etc. by the body of these elements such that electromagnetic radiation may be transmitted from one location to another. Said differently, the reference to communication herein may refer to the structural configuration or arrangement of structural components that provide communication from a power source to ultimately be outputted by the power combiner of the present disclosure. In other words, the communication provided by any component of the power combiner embodiments described herein refers to any structure, construct, housing, enclosure, channel, conduit, waveguide, or the like through which electromagnetic radiation may propagate.

Furthermore, as described hereafter, the power combiner embodiments of the present disclosure may include or define one or more "waveguides" or "waveguide structures." In addition to the definition above, the present disclosure contemplates that these terms may refer to a conduit through which electromagnetic radiation may propagate in the absence of other features, elements, components, or the like. Said differently, in some embodiments, the structure of the described waveguide may operate to combine electromagnetic energy and reduce or preclude signal back reflection via this structure as opposed to reliance upon additional elements (e.g., tuners, filters, or the like disposed in the path of the electromagnetic radiation).

Overview

As described above, electromagnetic radiation of various types, such as RF radiation (e.g., radio waves, microwaves, etc.) may be used in radio and television broadcasting, wireless networking, satellite communication, navigation, military applications, and the like, in which radio waves (e.g., electromagnetic radiation) are used to transmit information (e.g., data, signals, etc.) across space. To effectively broadcast example radio signals, radio communication systems may leverage power combiners to aggregate, group, or otherwise combine electromagnetic radiation, RF radiation, radio signals, etc. for transmission. These power combiners may be used to increase the bandwidth for high power transmission applications by outputting a single output signal that is a collection of the signals (e.g., electromagnetic radiation) supplied to the combiner. For example, power combiners may be used in any commercial application in which relatively high peak and average power are required (e.g., weather radars, high-powered ground or ship configured radar systems, etc.).

As signals travel along a transmission path or otherwise propagate through a conduit, insertion loss or attenuation may occur in which energy or power associated with the signal diminishes. In the context of multiple signals, such as in power combiners, the insertion loss or attenuation associated with each signal may substantially impact the power associated with the combined power signal. Furthermore, each signal may experience back reflection in which at least a portion of the signal is reflected or otherwise directed in a direction other than towards the output location resulting in degradation to the particular signal. As above, the back reflection of individual signals (e.g., electromagnetic radiation) may further operate to interfere with other signals with which the degraded signal is to be combined. In other words, the failure to properly reduce or prevent signal back reflection as often found in traditional power combiner implementations results in increased impact to the overall operation of the power combiner due to the common conduit shared by these distinct signals (e.g., electromagnetic radiation). Conventional systems that rely upon coaxial power inputs often leverage tuners disposed within the system to attempt to reduce or prevent this interaction. For example, signals (e.g., electromagnetic radiation) may include modes that represent the field pattern of the waves that form the signal. Conventional systems rely upon tuners, filters, or similar components within the system to avoid the interaction of waves having a mode that is undesired by the system. This reliance on additional components not only operates to increase the cost associated with manufacturing power combiners, but further operates as an additional element that may impact the signals received by the power combiner (e.g., serving as a further source for potential back reflection, insertion loss, etc.)

Traditional power combiner implementations are also often coaxial in geometry which typically results in narrow frequency band limitations. These coaxial implementations further only successfully function when all inputs have a satisfactory Voltage Standing Wave Ratio (VSWR), phase match, and when each input channel substantially or approximately matches the associated source. If the output source match degrades and affects the input port-to-port VSWR and associated isolation (e.g., thus affecting the phase matching from port-to-port), performance for these conventional implementations degrades at the rate at which the output power diminishes preventing the combining functionality attempted to be provided by these designs. Furthermore, these conventional power combiners fail to provide the ability to operate over a wide frequency band and/or the ability to perform under relatively high peak and average power levels due to the determinantal effects of heat on these implementations (e.g. the failure to properly dissipate heat).

To address these issues and others, the embodiments of the present disclosure provide for a power combiner that leverages waveguide structures that combine signals in the absence of additional system components. For example, the embodiments described hereafter may utilize the structure of a central combining conduit that receives a plurality of electromagnetic radiation inputs (e.g., signals) to minimize insertion loss between the respective electromagnetic radiation inputs and the combined power signal, such as by dimensioning the central combining conduit (e.g., a diameter or other dimension) to reduce or substantially prevent back reflection of the electromagnetic radiation inputs received from a plurality of power input structures. In doing so, the power combiners described herein may operate to provide electromagnetic radiation transmission with improved bandwidth as compared to conventional systems. Furthermore, the power combiners described herein provide the advantage of precisely machined electrical paths of equal path lengths, allowing excellent phase and VSWR port-to-port matching.

As described above, electromagnetic and/or RF components are further frequently subjected to varying operating conditions, external environment changes, and/or the like that may impact performance of these components. For example, a change in external temperature may operate to damage system components and/or result in performance degradation. In power combination applications, failure of one or more components (e.g., an input power source or the like) may impact operation of the remaining components, such as a detrimental impact to the output of other components or a reduction in the combined power signal output of the power combiner. Traditional systems, however, rely upon rigid solutions that fail to account for these variable conditions. The embodiments described herein, however, may leverage one or more sensors that generate operating data indicative of various operating parameters of the individual signal inputs (e.g., electromagnetic radiation) so as to modify operation of the power combiner to ensure consistent combined signal output. For example, some embodiments described herein may include temperature sensors that generate operating data indicative of a power input structure, and, in response, the power combiner may leverage a cooling loop to dissipate heat generated by the power input structure. By way of additional example, the power combiner may include sensors configured to detect the failure of a particular power source and, in response, supply additional power to one or more of the remaining power sources of the power combiner and/or reduce a power supplied to the failed particular power source. In this way, the embodiments described herein provide a power combiner that is dynamically modified in response to variable operating and/or environmental conditions.

Power Combiner

With reference to FIGS. 1-5, an example power combiner 100 of the present disclosure is illustrated. As shown, the power combiner 100 may include a plurality of power input structures 102 and a central combining conduit 104. The plurality of power input structures 102 may each define a waveguide as defined above configured to receive a respective electromagnetic radiation input (e.g., signal) from a respective power source 106. As shown in FIG. 1, the power combiner 100 may include, in some embodiments, sixteen (16) power input structures 102, each associated with respective power sources 106. Although illustrated herein with reference to an embodiment that includes sixteen (16) power input structures 102, the present disclosure contemplates that the power combiner 100 may be configured for use with any number of power input structures 102 and respective power sources 106 based upon the intended application of the power combiner 100. Said differently, the power combiner 100 of the present disclosure may operate as a N-way combiner in which N number (e.g., where N is a positive integer value) of power input structures 102 and/or power sources 106 are included. As would be evident in light of the present disclosure, the dimensions of the central combining conduit 104 as described hereafter may operate as a functional limitation on the number and/or size of the plurality of power input structures 102 with which the power combiner 100 operates.

Figure 2:
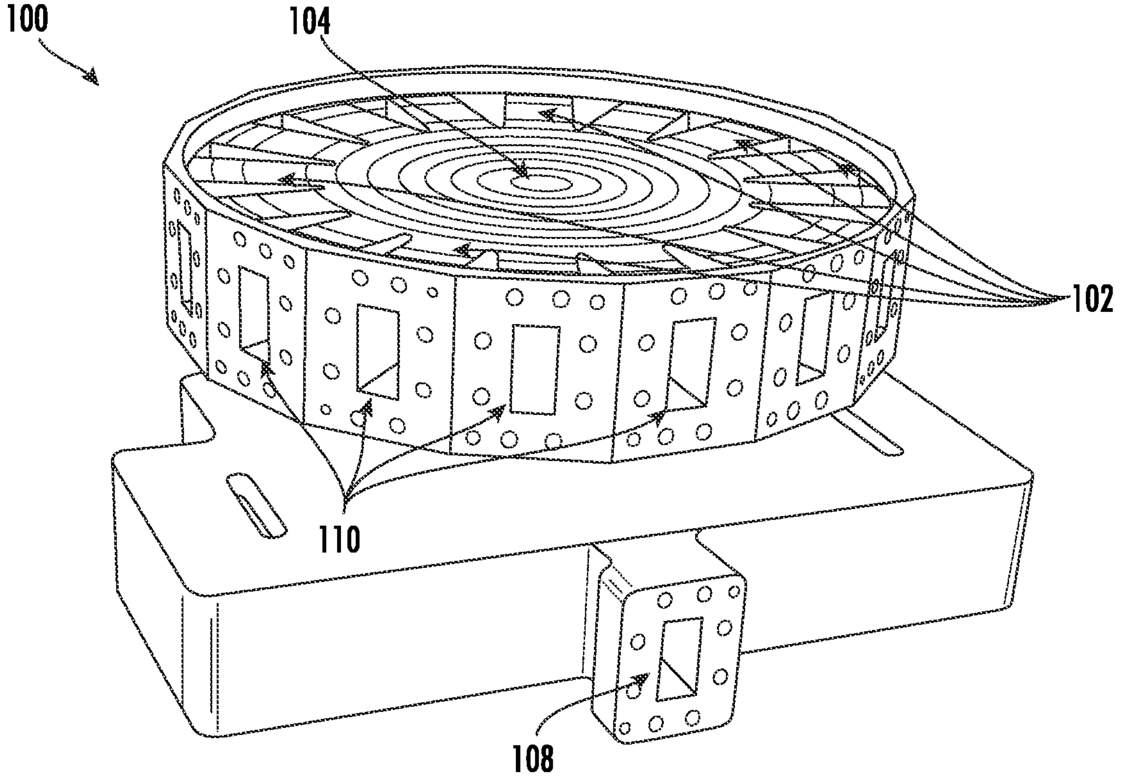
FIG. 2 illustrates another perspective view of an example power combiner of the present disclosure absent power sources in accordance with some example embodiments described herein.
Figure 3:
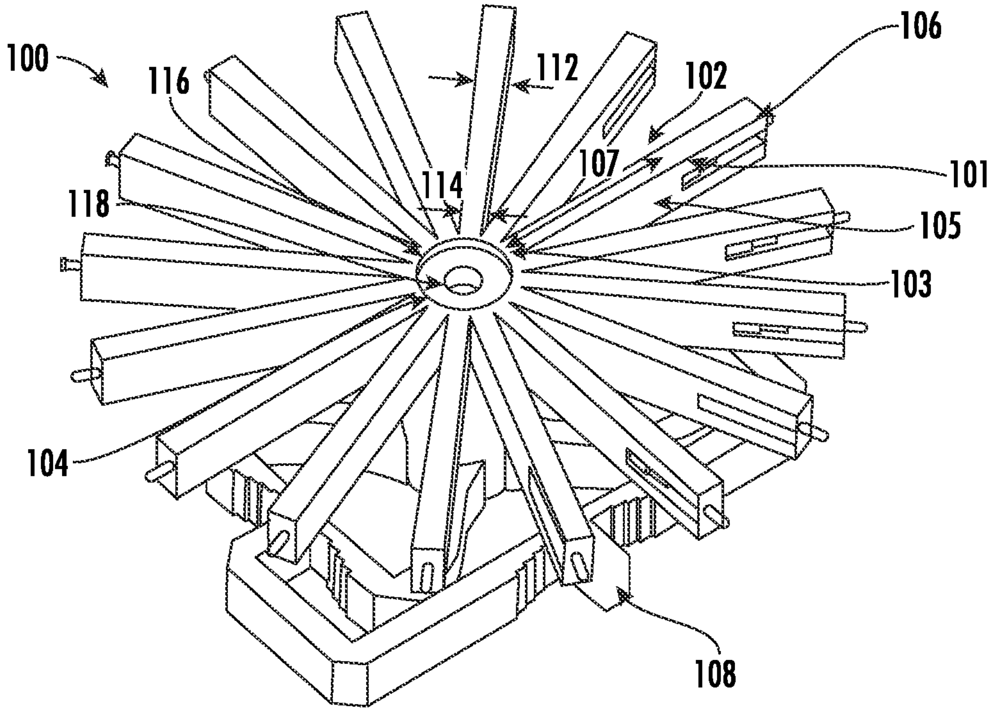
FIG. 3 illustrates another perspective view of an example power combiner of the present disclosure in accordance with some example embodiments described herein.
Figure 4:
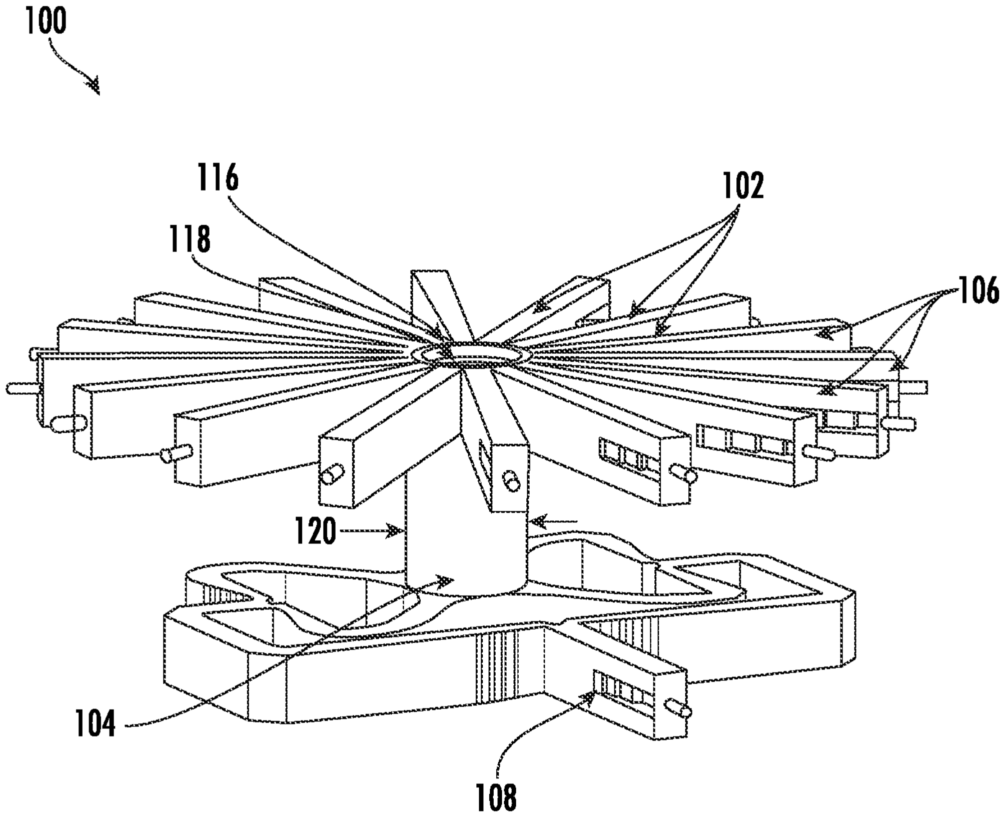
FIG. 4 illustrates a side perspective view of the example power combiner of FIG. 3 in accordance with some example embodiments of the present disclosure.

In some embodiments, as shown in FIGS. 1, 3, and 4, the power combiner 100 may include a plurality of solid-state power inputs 106, each of which may be coupled to a respective one of the plurality of power input structures 102. By way of example, solid-state power inputs 106 may operate as a power source with an output of electromagnetic radiation that may be closely controlled. For example, solid-state power inputs 106 of the present disclosure may, via control by a computing device 200 as described hereafter, allow for the frequency, phase, power level, and/or the like of the electromagnetic radiation emitted by the solid-state power input 106 to be modified in substantially real-time, features not found in conventional tube-based solutions. In some embodiments, as shown in FIG. 2, the plurality of power sources 106 (e.g., the solid-state power inputs 106) may each be removably attached with respective power input structures 102. For example, the power input structures 102 may define respective input openings 110 that may each be configured to receive electromagnetic radiation (e.g., signals) output by respective power sources 106 (e.g., solid-state power inputs 106) in an instance in which these power sources 106 are communicably coupled with the respective power input structures 102. In this way, the embodiments described herein may provide a modular solution in which power sources 106 may be quickly replaced, such as instances in which a failure condition occurs for one or more power sources 106. Although described herein with reference to solid-state power inputs as example power sources 106, the present disclosure contemplates that any device capable of generating electromagnetic radiation (e.g., signals) may be used by the power combiner 100.

Figure 8:
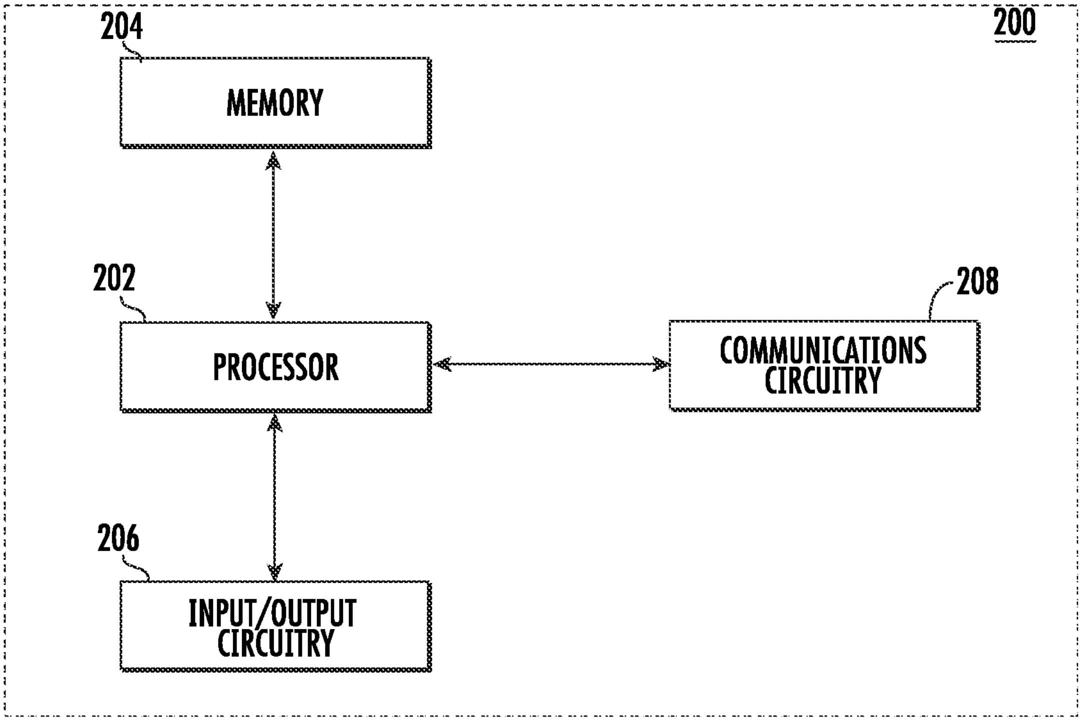
FIG. 8 illustrates an example computing device configured to, in whole or in part, perform various operations described herein.
Figure 9:
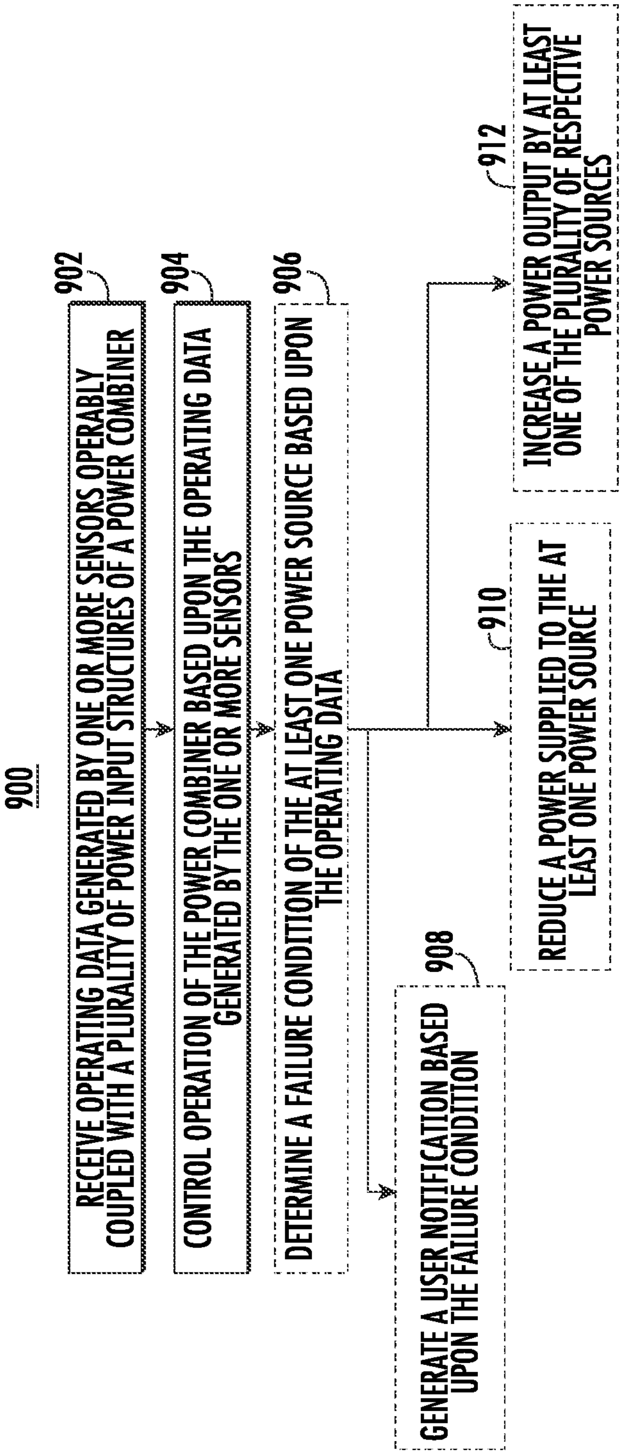
FIG. 9 is a flowchart illustrating a method for power supply modification according to an example embodiment of the present disclosure.
Figure 10:
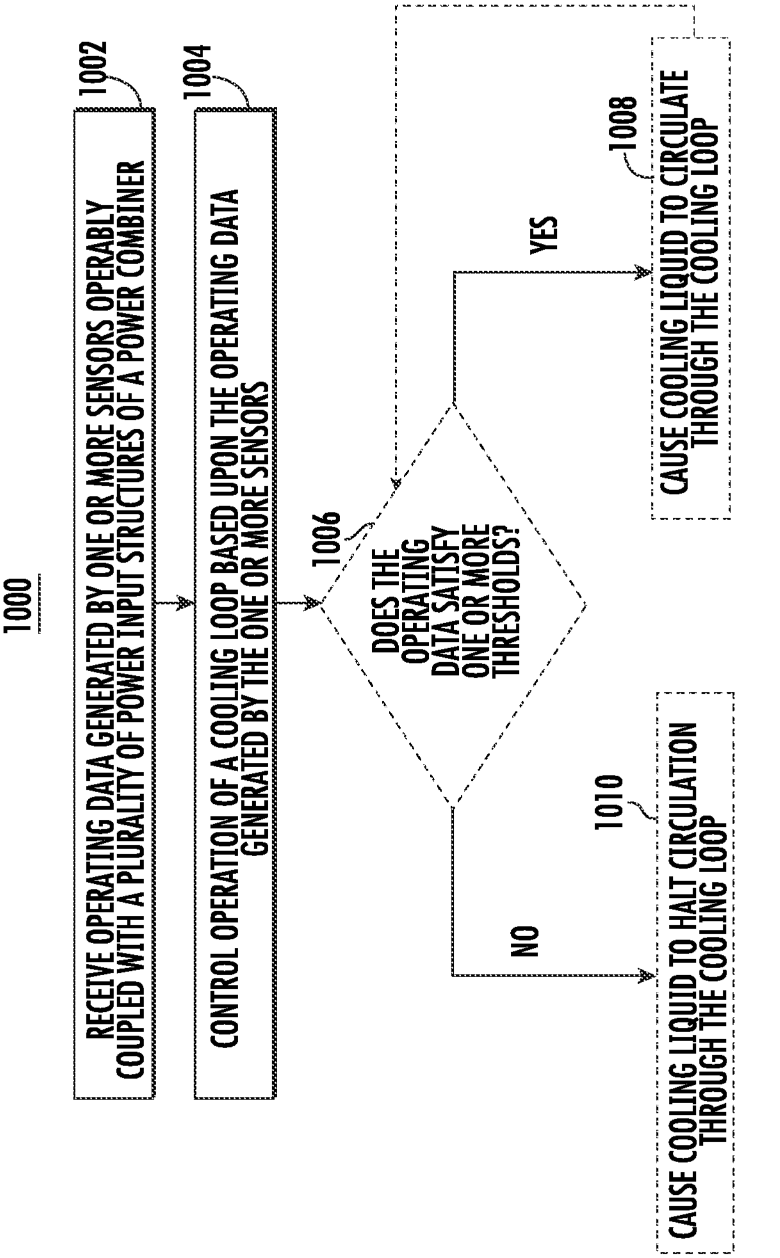
FIG. 10 is a flowchart illustrating a method for cooling loop operation according to an example embodiment of the present disclosure.

With continued reference to FIG. 1, in some embodiments as described further hereafter with reference to FIGS. 8-10, the power combiner 100 may include a computing device 200 configured to control operation, in whole or in part, of the power combiner 100 and/or one or more sensors 300 operably coupled with the computing device 200 and the plurality of power sources 106 (e.g., solid-state power inputs 106) of the power input structures 102. In such an embodiment, the one or more sensors 300 may be configured to generate operating data indicative of one or more operating parameters of the power combiner 100. The one or more sensors 300 may be mated in power sensing locations to monitor incident and reflected power to determine system efficiency and/or operation status. For example, the one or more sensors 300 may comprise one or more temperature sensors, thermometers, thermistors, thermocouples, and/or the like configured to generate temperature data indicative of the temperature of at least a portion of the power input structure(s) 102. In some embodiments, a plurality of sensors 300 may be leveraged by the power combiner 100 with one or more sensors associated with each of the plurality of power input structures 102 so as to, for example, generate operating data, such as indicative of the temperature associated with each of the plurality of power input structures 102. The one or more temperature sensors may be located at any position and at any orientation of an example power input structure 102 based upon the intended application of the power combiner 100. As described hereafter, the example operating data indicative of the temperature of the power input structure 100 may be used to, in whole or in part, control operation of a cooling loop (e.g., cooling loop 124 in FIGS. 6A-6B) of the power combiner 100.

By way of an additional example, the one or more sensors 300 may be configured to generate operating data indicative of at least one of the electromagnetic radiation inputs received from at least one respective power source 106. The one or more sensors 300 may, in some embodiments, be mated in power sensing locations to be operably coupled with the one or power input structures 102 and configured to determine the presence or absence of electromagnetic radiation received by the respective power input structure 102 (e.g., electromagnetic radiation meter or the like). In doing so, the one or more sensors 300 may generate operating data indicative of a potential failure condition of a power source 106 coupled with a particular power input structure 102, such as in instances in which the one or more sensors 300 fail to detect the presence of electromagnetic radiation (e.g., signals). In instances in which the power combiner 100 comprises the one or more power sources 106, the one or more sensors 300 may be operably connected with the one or more power sources 106 so as to determine a potential failure condition of any of the one or more power sources 106, such as in an instance in which a particular power source 106 fails to be supplied with electrical power so as to be capable of generating electromagnetic radiation (e.g., signals). As described hereafter, the example operating data indicative of the electromagnetic radiation inputs may be used, in whole or in part, to control operation of the power combiner 100.

Figure 5:
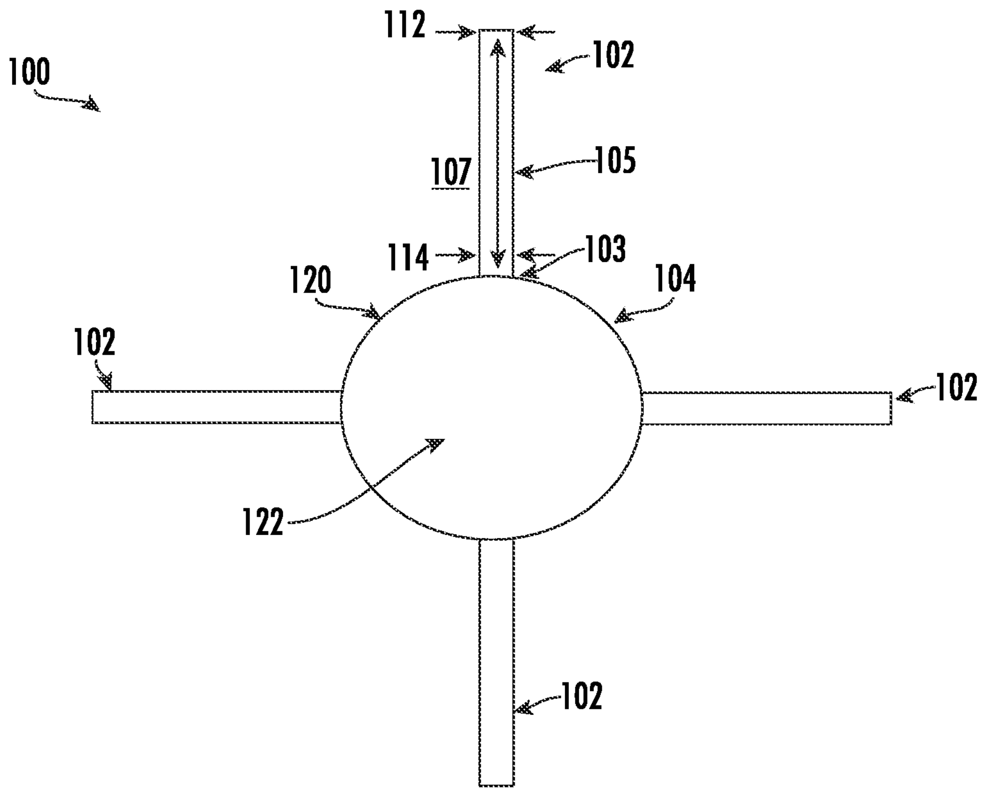
FIG. 5 illustrates a top cross-sectional view of an example power combiner of the present disclosure in accordance with some example embodiments of the present disclosure.

With reference to FIGS. 3 and 5, the power input structures 102 of the power combiner 100 may each define a waveguide configured to receive a respective electromagnetic radiation input and direct the input along the power input structure 102 to the central combining conduit 104 coupled thereto. As described above, the waveguide defined by the power input structure 102 may define any structure, construct, housing, enclosure, channel, conduit, or the like through which electromagnetic radiation may propagate. Each of the power input structures 102 may include a body 105 defining a first end 101, a second end 103 opposite the first end 101, and the waveguide extending therebetween (e.g., along a length 107). The first end 101 may be configured to receive the respective electromagnetic radiation input from the respective power source 106, such as from a solid-state power input removably attached thereto. The second end 103 may be defined opposite the first end 101 and configured to couple the respective power input structure 102 to the central combining conduit 104 such that the electromagnetic radiation (e.g., signals) may propagate along the waveguide defined by the body 105 of the power input structure 102 from the first end 101 to the second end 103.

As shown, the power input structure 102 may taper along is length 107 from the first end 101 to the second end 103. In other words, the body 105 of the power input structure 102 may be dimensioned such that a first cross-sectional area 112 of the body 105 proximate the first end 101 may be greater than a second cross-sectional area 114 proximate the second end 103. As described above, the dimensions of the central combining conduit 104 as described hereafter may operate as a functional limitation on the number and/or size of the plurality of power input structures 102 with which the power combiner 100 operates. To accommodate each of the plurality of power input structures 102, the body 105 of each of the power input structures 102 may taper such that the second end 103 of the body is smaller in size relative the opposite first end 101. As described hereafter, in some embodiments, the plurality of power input structures 102 may be formed integral to the central combining conduit 104 (e.g., an integral or monolithic structure). The tapering of each of the plurality of power input structures 102 may further be configured to provide adequate interconnection space into the central combining conduit 104 and to allow for sufficient space at the junction point between the respective power input structure 102 and the central combining conduit 104 to achieve port-to-port isolation and VSWR match between the respective power input structure 102. In doing so, this configuration provides improved protection to the plurality of power input structures 102 from high reflections, which may damage those sources.

Although described and illustrated herein with reference to power input structures 102 that define a rectangular cross-sectional shape, the present disclosure contemplates that the power input structures 102 may define any cross-sectional shape and may further be dimensioned based upon the intended application of the power combiner 100. Furthermore, although each of the power input structures 102 of the present disclosure are described and illustrated with reference to a common shape, size, orientation, etc., the present disclosure contemplates that each power input structure 102 may be independently dimensioned (e.g., sized and shaped) based upon the intended application of the power combiner 100. Furthermore, although described and illustrated with rectangular cross-sectional shapes, the power input structures 102 may be formed of any cross-sectional shape so long as proper source matching is maintained to allow propagation for the desired frequency while rejecting higher order modes. As defined above, each of the plurality of power input structures 102 may, in some embodiments, comprise a waveguide structure that allows electromagnetic radiation (e.g., signals) to propagate in the absence of other components (e.g., the interior of the body 105 allows for unimpeded signal propagation).

The power combiner 100 further includes a central combining conduit 104 configured to receive the respective electromagnetic radiation inputs communicated via respective power input structures 102. As shown, the power combiner 100 may be formed as a radial power combiner in that the central combining conduit 104 defines a circular cross-sectional shape such that each of the power input structures 102 are positioned circumferentially around the central combining conduit 104 and extend radially outward from the central combining conduit 104. As such the central combining conduit 104 may be communicably coupled with each of the plurality of power input structures 102 via the respective second ends 103 such that each of the distinct electromagnetic radiation inputs transmitted by respective power input structures 102 are received at a common location (e.g., the central combining conduit 104). The central combining conduit 104 may further operate to combine the respective electromagnetic radiation inputs into a combined power signal for output via an output port 108 communicably coupled with the central combining conduit 104. As shown in the top cross-sectional view of FIG. 5, the central combining conduit 104 may define an interior 122 that defines a waveguide structure within which the distinct electromagnetic radiation inputs (e.g., signals) may be combined. As would be evident in light of the present disclosure, each of the electromagnetic radiation inputs received by the central combining conduit 104 may be associated with various parameters (e.g., frequency, mode, phase, bandwidth, etc.) such that the central combining conduit 104 may be configured to account for these varying parameters to combine each of the electromagnetic radiation inputs into a combined power signal for output via the output port 108. In other words, the central combining conduit 104 allows for the phase matched inputs (e.g., received via the plurality of power input structures 102) to fold into a combined multichannel arrangement while providing reverse isolation for each input signal to protect the individual input sources from damaging reflected signals.

As shown in FIG. 4, the central combining conduit 104 may be stepped down from the dimensions of the respective power input structures 102 such that the electromagnetic radiation inputs from the power input structures 102 are properly received by the central combining conduit 104. For example, the central combining conduit 104 may include a first step 116 and a second step 118 of varying dimensions (e.g., decreasing diameter). The present disclosure contemplates that the associated dimensions (e.g., size and shape) of the first step 116 and second step 118 may vary based upon the intended application of the power combiner 100 and that the number of associated steps 116, 118 may also vary. In other words, the number and dimensions of the central combining conduit 104 at the intersection or junction with the plurality of power input structures 102 may operate as a design consideration based upon the number of power input structures 102 and/or the parameters (e.g., mode, bandwidth, frequency, etc.) of the electromagnetic radiation inputs (e.g., signals) received from the power input structures 102. In other words, the geometry of the central combing conduit 104 is configured to eliminate unwanted higher order modes while maintaining the required dominant mode behavior (e.g., transverse electric mode TE01) for as wide a frequency band-pass performance at its maximum efficiency while maintaining minimum VSWR degradation.

The central combining conduit 104 may further be configured to minimize insertion loss between the respective electromagnetic radiation inputs and the combined power signal. As detailed above, many conventional systems rely upon additional components disposed within a central combining conduit, such as a tuning element, filter, or the like, in an attempt to improve performance. In the power combiner 100 embodiments described herein, the central combining conduit 104 may consist of a waveguide structure in that the plurality electromagnetic radiation inputs are combined in the absence of any other devices (e.g., a tuning element or the like). Said differently, the electromagnetic radiation inputs received from the plurality of power input structures 102 moves through the central combining conduit 104 substantially unimpeded due to the absence of additional elements found in traditional devices. To ensure that the electromagnetic radiation inputs (e.g., signals) may be properly combined to reduce, minimize, or otherwise prevent insertion loss between the respective electromagnetic inputs and the combined power signal, the central combining conduit 104 may be dimensioned so as to reduce or substantially prevent back reflection of the electromagnetic radiation inputs received from the plurality of power input structures 102. By way of example, a diameter 120 of the central combining conduit 104 may be configured to reduce or substantially prevent back reflection of the electromagnetic radiation inputs received from the plurality of power input structures 102.

In conventional systems, such as those associated with coaxial power sources, several modes (e.g., the field pattern of the propagating waves) associated with the electromagnetic radiation inputs (e.g., signals) may be present. To select a particular mode for use in combining signals, these conventional systems must rely upon additional filtering elements, such as a tuning element, to prevent the effect of non-selected modes. In the power combiner 100 of the present application, however, the dimensions (e.g., diameter 120) of central combining conduit 104 may operate as a structural filter (e.g., natural isolation) for a particular mode. For example, the diameter 120 of the central combining conduit 104 may be such that only the dominant mode of the plurality of electromagnetic radiation inputs (e.g., signals) propagates through the central combining conduit 104 for combining into the combined power signal output.

As such, the power combiner 100 of the present disclosure may be designed to account for the particular mode of the designed combined power signal output in the dimensioning of the central combining conduit 104. Although described herein with reference to an example diameter 120, the present disclosure contemplates that any dimension of the central combining conduit 104 may be designed to reduce or substantially prevent back reflection of the electromagnetic radiation inputs received from the plurality of power input structures 102. In doing so, the embodiments of the present disclosure may operate to improve the operational or performance outputs relative to traditional power combiner configurations. For example, a bandwidth of the combined power signal output by the power combiner 100 may be at least 16% of the sum of a bandwidth of the electromagnetic radiation inputs. Given that the input ports (e.g., the plurality of power input structures 102) directly feed the central combining conduit 104, the configuration of the present application eliminates the additional stepped transformers required by conventional designs thereby maintaining full power handling, providing insertion loss consistency, and reducing manufacturing costs. For example, in some embodiments, the power combiner 100 may exhibit a power efficiency of greater than or equal to approximately 95%.

Figure 6A:
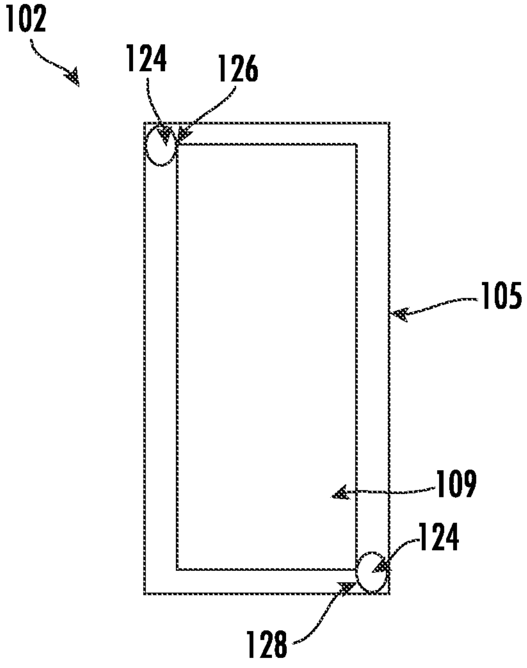
FIGS. 6A-6B illustrate an example cooling loop for use with some example power combiner embodiments described herein.
Figure 6B:
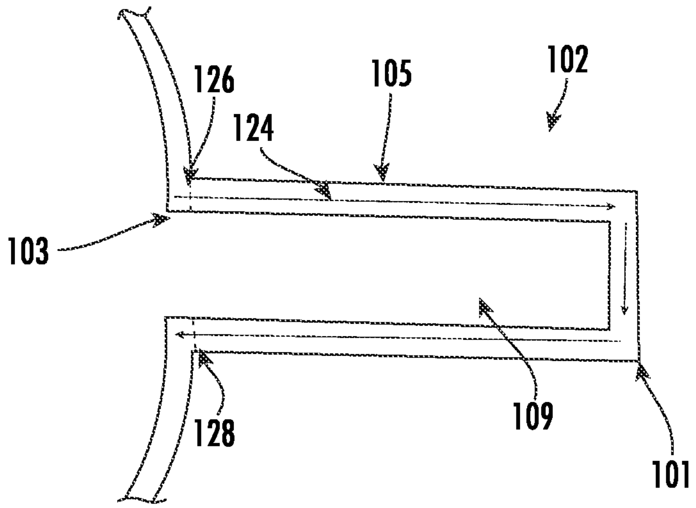

With reference to FIGS. 6A-6B, in some embodiments, the power combiner 100 may further include a cooling loop 124 configured to dissipate heat from at least one of the power input structures 102 to an external environment of the power combiner 100. As described hereafter with reference to the operations of FIG. 10, the power combiner 100 may be subjected to various environmental conditions (e.g., increased temperature or the like) that may impact the performance of the power combiner 100. Furthermore, given that each of the plurality of power input structures 102 may be associated with distinct power sources 106, the operating temperatures for each of these independent power input structures 102 may vary. To dissipate heat, via convective cooling or otherwise, the power combiner 100 may include a cooling loop 124 that is formed integral to at least one of the power input structures 102. As shown, the body 105 of the example power input structure 102 may define an interior 109 through which an associated electromagnetic radiation input (e.g., signal) may propagate as described above.

The body 105, however, may further define a cooling loop 124 that defines a channel, tube, cooling jacket, conduit, or the like through which a cooling liquid may flow. In some embodiments, the cooling loop 124 may extend along the length 107 of the power input structure 102 such that a cooling liquid may circulate along substantially all of the power input structure 102. In operation, heat generated by the power input structure 102, may be dissipated due to a temperature differential between the cooling liquid within the cooling loop 124 and, for example, the interior 109 of the power input structure 102. The present disclosure contemplates that the cooling loop 124 may extend along any portion of the power input structure 102 and/or the central combining conduit 104 and may define any shape, dimension, or orientation based upon the intended application of the power combiner 100. Furthermore, the present disclosure contemplates that, in some embodiments, one or more of the power input structures 102 may define distinct (e.g., independently cooled) cooling loops 124. In other embodiments, however, the cooling loop 124 may operate to dissipate heat from a plurality of power input structures 102 in that these power input structures 102 may define or otherwise form an interconnected cooling loop 124. For example, the cooling loop 124 may extend along each of the plurality of power input structures 102 and circulate cooling liquid therethrough. As described hereafter, in some embodiments, the cooling loop 124 may be formed integral to the power combiner 100 so as to provide an integrated cooling solution.

In some embodiments, the cooling loop 124 may include an input valve 126 and/or an output valve 128 configured to permit selective access of a cooling liquid into the cooling loop 124. As described hereafter, the power combiner 100 may be configured to selectively dissipate heat from particular power input structures 102, such as in response to operating data generated by sensors 300 indicative of the temperature of one or more of the power input structures 102. To selectively dissipate heat from particular power input structures 102, the cooling loop 124 may include valves 126, 128 that may be operable to permit or preclude circulation of the cooling liquid through the cooling loop 124. Although described herein with reference to example valves, the present disclosure contemplates that any mechanism, pump, etc. for allowing and/or preventing access (e.g., fluid communication) of cooling liquid to the cooling loop 124 may be used by the power combiner 100. By way of a particular example, the central combining conduit 104 may define at least a portion of the cooling loop 124 (e.g., a circular fluid conduit) that may be intermittently tapped by power input structures 102 along the peripheral edge of the central combining conduit 104. Valves 126, 128 may be disposed at each of these tapped locations so as to allow a common cooling liquid to be selectively directed into particular portions of the cooling loop 124 to selectively dissipate heat from selected portions of the power combiner 100. Although described herein with reference to a cooling loop, the present disclosure also contemplates that other mechanisms for heat dissipation (e.g., conductive cooling, radiative cooling, phase change materials (PCMs), and/or the like) may be used alone or in conjunction with the example cooling loop 124.

Example Method of Manufacturing

Figure 7:
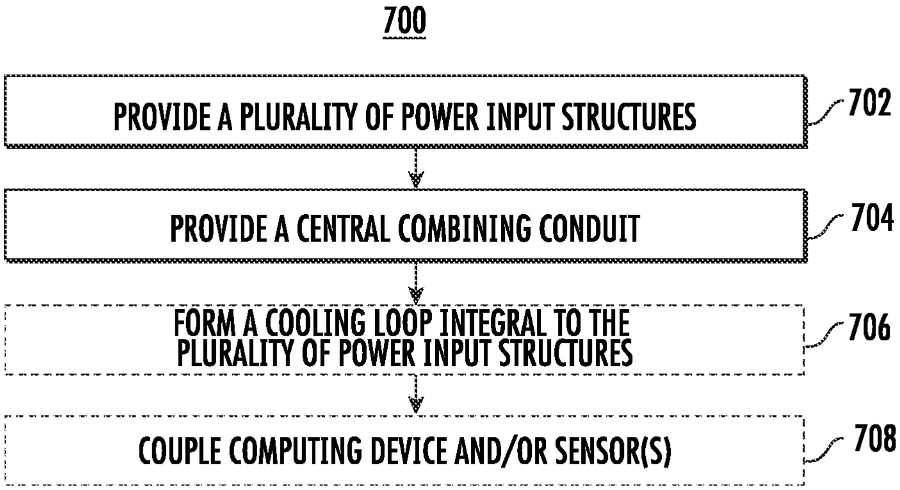
FIG. 7 illustrates an example method of manufacturing of a power combiner of the present disclosure in accordance with some example embodiments described herein.

With reference to FIG. 7, an example method of manufacturing a power combiner is illustrated. The method (e.g., method 700) may include the step of providing a plurality of power input structures at operation 702. As described above, the power input structures of the power combiner may each define a waveguide configured to receive a respective electromagnetic radiation input and direct the input along the power input structure to the central combining conduit coupled thereto. The waveguide defined by the power input structure may define any structure, construct, housing, enclosure, channel, conduit, or the like through which electromagnetic radiation may propagate. Each of the power input structures may include a body defining a first end, a second end opposite the first end, and the waveguide extending therebetween (e.g., along a length). The first end may be configured to receive the respective electromagnetic radiation input from the respective power source, such as from a solid-state power input removably attached thereto. The second end may be defined opposite the first end and configured to couple the respective power input structure to the central combining conduit such that the electromagnetic radiation (e.g., signals) may propagate along the waveguide defined by the body of the power input structure from the first end to the second end. The power input structure may taper along is length from the first end to the second end such that a first cross-sectional area of the body proximate the first end may be greater than a second cross-sectional area proximate the second end.

Thereafter, the method (e.g., method 700) may include the step of providing a central combining conduit at operation 704. As described above, the central combining conduit may be configured receive the respective electromagnetic radiation inputs communicated via respective power input structures and may be formed as a radial power combiner. For example, the central combining conduit may define a circular cross-sectional shape such that each of the power input structures are positioned circumferentially around the central combining conduit and extend radially outward from the central combining conduit. As such the central combining conduit may be communicably coupled with each of the plurality of power input structures via the respective second ends such that each of the distinct electromagnetic radiation inputs transmitted by respective power input structures are received at a common location (e.g., the central combining conduit). The central combining conduit may be stepped down from the dimensions of the respective power input structures such that the electromagnetic radiation inputs from the power input structures are properly received by the central combining conduit. The central combining conduit may further be configured to minimize insertion loss between the respective electromagnetic radiation inputs and the combined power signal. To ensure that the electromagnetic radiation inputs (e.g., signals) may be properly combined to reduce, minimize, or otherwise prevent insertion loss between the respective electromagnetic inputs and the combined power signal, the central combining conduit may be dimensioned so as to reduce or substantially prevent back reflection of the electromagnetic radiation inputs received from the plurality of power input structures. In some embodiments, the central combining conduit and the plurality of power input structures may be formed as an integral or monolithic structure such that operations 702, and 704 may occur simultaneously via a brazing or additive manufacturing process.

Thereafter, in some embodiments, the method (e.g., method 700) may include the step of forming a cooling loop integral to the plurality of power input structures at operation 706. As described above, the cooling loop may be configured to dissipate heat from at least one of the power input structures to an external environment of the power combiner. To dissipate heat, via convective cooling, the power combiner include a cooling loop that is formed integral to at least one of the power input structures such that operation 706 may occur, in whole or in part, in the forming of the plurality of power input structures and/or the central combining conduit (e.g., an integrated solution). The cooling loop may define a channel, tube, cooling jacket, conduit, or the like through which a cooling liquid may flow. In some embodiments, the cooling loop may extend along the length of the power input structure such that a cooling liquid may circulate along substantially all of the power input structure. In operation, heat generated by the power input structure, may be dissipated due to a temperature differential between the cooling liquid within the cooling loop and, for example, the interior of the power input structure. As described above, the position, dimensions, size, orientation, etc. of the cooling loop may be based upon the corresponding configuration of the power combiner.

Thereafter, in some embodiments, the method (e.g., method 700) may include the step of coupling computing device and/or sensor(s) at operation 708. As described above, the power combiner of the present disclosure may include a computing device as described hereafter with reference to FIG. 8 and/or sensor(s) configured to generating operating data. As such, in embodiments in which the power combiner includes the computing device and/or sensor(s), the method 700 may include coupling the computing device and/or sensor(s) by providing connectivity between these components. In some embodiment, the computing device and/or sensor(s) may be physically attached to or located with the power combiner so as to provide an integrated solution. In other embodiments, the computing device and/or sensor(s) may be located remotely from the power combiner, such as connected via a network to one or more components housed locally by the power combiner. In any embodiment, the computing device and/or sensor(s) may be communicably coupled with the necessary components of the power combiner described herein so as to perform their associated functionality.

The manufacturing of the power combiners 100 described herein may be, in some instances, completed via the machining of three (3) sections (e.g., an input section, a transducer-quadrature section, and a hybrid output combiner section). The input section (e.g., the plurality of power input structures 102) may be machined in a manor to achieve equal path lengths into the quadrature section (e.g., the central combining conduit 104), allowing the input channels to fold into a quadrature arrangement. The output combiner section may be precision machined in a manner similar to that of the input section. The center section may operate as a cover plate for both the input and output sections easing the performance of brazing operations and achieving precision RF paths of equal geometry.

The embodiments described herein may also be scalable to accommodate at least the aforementioned applications. Various components of embodiments described herein can be added, removed, reorganized, modified, duplicated, and/or the like as one skilled in the art would find convenient and/or necessary to implement a particular application in conjunction with the teachings of the present disclosure. In various embodiments, the order of operations in manufacturing the power combiner may be modified. Moreover, specialized features, characteristics, materials, components, and/or equipment may be applied in conjunction with the teachings of the present disclosure as one skilled in the art would find convenient and/or necessary to implement a particular application in light of the present disclosure.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

Example Computing Device

As shown in FIG. 1, in some embodiments, the power combiner 100 may further comprise or otherwise be communicably coupled with a computing device 200. The computing device 200 may be configured to at least partially control operation of one or more components of the power combiner 100, such as the power source(s) 106, the cooling loop 124, etc. As described hereafter with reference to FIGS. 9-10, for example, the computing device 200 may be configured to receive operating data generated by the one or more sensors 300 mated in power sensing locations of the power combiner, and the computing device 200 may be further configured to modify operation of the power combiner 100 based upon such operating data provided by sensors 300, such as modifying a frequency, wavelength, etc. of the electromagnetic radiation (e.g., radio signals, radio waves, microwaves, etc.) received by the power combiner 100, causing/halting the circulation of a cooling liquid through the cooling loop 124, and/or the like.

To perform these operations, the computing device 200 may, as illustrated in FIG. 8, include a processor 202, a memory 204, input/output circuitry 206, and/or communications circuitry 208. The computing device 200 may be configured to execute the operations described below in connection with FIG. 9-10 Although components 202-208 are described in some cases using functional language, it should be understood that the particular implementations necessarily include use of particular hardware. It should also be understood that certain of these components 202-208 may include similar or common hardware. For example, two sets of circuitry may both use the same processor 202, memory 204, communications circuitry 208, or the like to perform their associated functions, such that duplicate hardware is not required for each set of circuitry. The term "circuitry" as used herein includes particular hardware configured to perform the functions associated with respective circuitry described herein. In some embodiments, various elements or components of the circuitry of the computing device 200 may be housed within the power combiner 100 (e.g., an integrated solution). In other embodiments, the computing device 200 may be located separate from the power combiner 100. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Signals transmitted and/or received by the communications circuitry 208 may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Example Methods for Power Supply Modification

With reference to FIG. 9, a method of power supply modification according to embodiments of the present disclosure is provided (e.g., method 900). As detailed above, the sensors 300 may be configured to generate operating data indicative of one or more operating parameters of the power combiner, such as data indicative of at least one of the electromagnetic radiation inputs received from at least one respective power source. As such and as shown at operation 902, the computing device 200 may include means, such as processor 202, communications circuitry 208, or the like, for receiving operating data generated by one or more sensors operably coupled with a plurality of power input structures of a power combiner. By way of example, the power combiner may, in some embodiments, comprise the computing device 200 such that the computing device 200 receives various instances of operating data of the power combiner by internal communication. In other embodiments, the computing device 200 may be located separately from the power combiner but connected via a network such that the operation 902 refers to a transmission by the sensors to the computing device 200.

Thereafter, as shown at operation 904, the computing device 200 may include means, such as processor 202, communications circuitry 208, or the like, for controlling operation of the power combiner based upon the operating data generated by the one or more sensors. As described above, the one or more sensors may be configured to generate operating data indicative of at least one of the electromagnetic radiation inputs received from at least one respective power source. The one or more sensors may, in some embodiments, be operably coupled with the one or power input structures and configured to determine the presence or absence of electromagnetic radiation received by the respective power input structure (e.g., electromagnetic radiation meter or the like). In some further embodiments, the one or more sensors may be configured to generate operating data indicative of one or more operating parameters associated with the electromagnetic radiation inputs (e.g., bandwidth, mode, frequency, etc.). In doing so, the one or more sensors 300 may generate operating data indicative of a potential failure condition of a power source coupled with a particular power input structure, such as in instances in which the one or more sensors 300 fail to detect the presence of electromagnetic radiation (e.g., signals) and/or detect a change in the operating parameters of the electromagnetic radiation inputs (e.g., a reduced bandwidth or the like). Thereafter, the computing device 200 may control operation of the power combiner, as described hereafter, based upon the received operating data.

Thereafter, in some embodiments, as shown at operation 906, the computing device 200 may include means, such as processor 202, communications circuitry 208, or the like, for determining a failure condition of the at least one power source based upon the operating data. In instances in which the power combiner comprises the one or more power sources, the one or more sensors may be operably connected with the one or more power sources so as to generate operating data indicative of a potential failure condition of any of the one or more power sources. For example, the computing device 200 may receive operating data from the sensors 300 indicative of such a condition as in an instance in which a particular power source fails to be supplied with electrical power so as to be capable of generating electromagnetic radiation (e.g., signals). By way of an additional example, the computing device 200 may determine the failure condition at operation 906 in an instance in which the associated power input structure fails to include electromagnetic radiation inputs indicative of a potential failure of the associated power source.

Thereafter, in some embodiments, as shown at operation 908, the computing device 200 may include means, such as processor 202, communications circuitry 208, or the like, for generating a user notification based upon the failure condition for rendering to an operator associated with the power combiner. As would be evident in light of the present disclosure, in some embodiments, an operator, user, or the like may be associated with the power combiner and configured to, in whole or in part, control operation thereof. As such, in such an embodiment, the user notification generated at operation 908 may be rendered, such as via a display of the computing device 200, for viewing by the associated operator. The present disclosure contemplates that the user notification may further include data indicative of one or more operating parameters of the example power source, such as a reduced bandwidth or the like associated with the failure condition. The user notification may further provide a visual representation of the particular power supply associated with the failure notification so as to facilitate repair or replacement of the particular power supply.

Thereafter, in some embodiments as shown at operation 910, the computing device 200 may include means, such as processor 202, communications circuitry 208, or the like, for reducing a power supplied to the at least one power source associated with the failure condition. In some instances, the failure condition of the at least one power source may be indicative of the inability of the power source to generate electromagnetic radiation for transmission via the associated power input structure. As such, supplying power to the power source having this failure condition may be unnecessary (e.g., a waste of resources). In response, the computing device 200 may generate instructions for halting power provided to the power source having the failure condition so as to limit or prevent the unnecessary expenditure of resources. Furthermore, reducing or halting the power provided to the power source having the failure condition may operate to further facilitate repair or replacement of this particular power source.

Thereafter, in some embodiments, as shown at operation 912, the computing device 200 may include means, such as processor 202, communications circuitry 208, or the like, for increasing a power output by at least one of the plurality of respective power sources other than the power source associated with the failure condition. As would be evident in light of the present disclosure, the inability of a particular power source (e.g., having the failure condition) to generate electromagnetic radiation inputs for transmission to the central combining conduit for use in generating a combined power output signal reduces the performance of the combined power signal. To potentially compensate for this reduction in the electromagnetic radiation received by the central combining conduit, the computing device may generate instructions for increasing the power supplied to one or more other power sources so as to increase the bandwidth associated with the electromagnetic radiation generated by these power sources. In some instances, the increase in power supplied to one or more other power sources (e.g., other than the power source having the failure condition) may be for a determined period of time (e.g., a time required to replace or repair the power source having the failure condition.

In some embodiments, the power increase at operation 912 may be to power sources positioned proximate the power source having the failure condition. For example, the plurality of power input structures and associated power sources may be formed as a plurality of quadratures. As such, in some embodiments, operation 912 may refer to increasing the power output associated with a power source within a common quadrature of the power source having the failure condition. Although described herein with reference to modification to power supplied to a power source, the present disclosure contemplates that the computing device 200 may be configured to modify any parameter of the power combiner so as to mitigate the effect of an inoperable power source (e.g., any reduction in the electromagnetic radiation received by the central combining conduit). In other words, the embodiments described herein, such as those described with reference to FIG. 9, allow for RF power to be outputted with reduced input sources while maintaining VSWR. The port-to-port isolation from the plurality of power input structures 102 to the central combining conduit 104 protects against reflected power into the power input structures 102 such that, if a quadrature feed loses phase matching, the remaining phase matched channels continue to operate.

Example Methods for Cooling Loop Operation

With reference to FIG. 10, a method of cooling loop operation according to embodiments of the present disclosure is provided (e.g., method 1000). As detailed above, the sensors 300 may be configured to generate operating data indicative of one or more operating parameters of the power combiner, such as data indicative of a temperature of the at least one of the power input structures. As such and as shown at operation 1002, the computing device 200 may include means, such as processor 202, communications circuitry 208, or the like, for receiving operating data generated by one or more sensors operably coupled with a plurality of power input structures of a power combiner. By way of example, the power combiner may, in some embodiments, comprise the computing device 200 such that the computing device 200 receives various instances of operating data of the power combiner by internal communication. In other embodiments, the computing device 200 may be located separately from the power combiner but connected via a network such that the operation 1002 refers to a transmission by sensors to the computing device 200.

Thereafter, as shown at operation 1004, the computing device 200 may include means, such as processor 202, communications circuitry 208, or the like, for controlling operation of the power combiner based upon the operating data generated by the one or more sensors. As described above, the one or more sensors 300 may comprise one or more temperature sensors, thermometers, thermistors, thermocouples, and/or the like configured to generate temperature data indicative of the temperature of at least a portion of the power input structure(s). The one or more temperature sensors may be located at any position and at any orientation of an example power input structure based upon the intended application of the power combiner. Thereafter, the computing device 200 may control operation of the cooling loop, as described hereafter, based upon the received operating data indicative of the temperature within the power input structure(s).

Thereafter, in some embodiments as shown at operation 1006, the computing device 200 may include means, such as processor 202, communications circuitry 208, or the like, for comparing the operating data against one or more thresholds. By way of continued example, in an instance in which the operating data is indicative of the temperature of at least one location within the power combiner, the one or more thresholds may refer to thresholds associated with temperature values against which the operating data may be compared. For example, the operating data may be indicative of a temperature value within a power input structure that exceeds a recommended or required operating temperature (e.g., as set by an operator, administrator, governmental regulation, industry standard, etc.). As such, satisfying the one or more thresholds may refer to an instance in which the operating data is indicative of a temperature that exceeds such a threshold. Conversely, failing to satisfy the one or more thresholds may refer to an instance in which the operating data is indicative of a temperature that fails to exceed such a threshold.

Thereafter, in some embodiments as shown at operation 1008, the computing device 200 may include means, such as processor 202, communications circuitry 208, or the like, for, in response to an instance in which the operating data satisfies one or more associated temperature thresholds, causing the cooling liquid to circulate through the cooling loop. As described above, the cooling loop may define valves that permit selective access (e.g., ingress and egress) of cooling liquid into the cooling loop. As such, in response to determining that the temperature detected by the sensors (e.g., operating data) exceeds the temperature defined by the one or more thresholds, the computing device 200 may generate instructions that cause the one or more valves to allow cooling liquid to circulate within the cooling loop. In some embodiments, the computing device 200 may cause the cooling liquid to circulate within the cooling loop via one or more pumps or other mechanisms for generating positive or negative pressure. Furthermore, in instances in which the sensors 300 are coupled with particular power input structures, operation 1008 may refer to a targeted circulation of cooling liquid within the cooling loop, such as by generating instructions that cause the valves associated with a particular portion of the cooling loop associated with the particular power input structure to allow circulation of cooling liquid within said power input structure.

Given the interconnected nature and close proximity of the power input structures, the present disclosure contemplates that, in some embodiments, the computing device 200 may cause cooling liquid to circulate in power input structures proximate the particular power input structure associated with the operating data indicative of temperature so as to reduce the impact of the temperature at this location with respect to other nearby locations. Furthermore, although described herein with reference to example valves, the present disclosure contemplates that any mechanism for causing and/or halting fluid flow may be used with the power combiner embodiments described above.

Thereafter, in some embodiments as shown at operation 1010, the computing device 200 may include means, such as processor 202, communications circuitry 208, or the like, for in response to an instance in which the operating data fails to satisfy one or more associated temperature thresholds, causing the cooling liquid to halt circulation through the cooling loop. By way of example, in some instances, the computing device 200 may cause cooling liquid to circulate within the cooling loop so as to dissipate heat from all or some of the power input structures. Following sufficient heat dissipation from all or some of the power input structures, the operating data indicative of a temperature within the power combiner may fail to satisfy the one or more thresholds. As such, the computing device 200 may generate instructions causing operation of an example pump, valve, etc. to halt to prevent circulation of the cooling liquid. Similar to operation 1008, the halting of the circulation of cooling liquid may be power input structure dependent (e.g., halting circulation for particular power input structures). As would be evident in light of the present disclosure, the operations of FIG. 10 may be performed iteratively based upon iterative generation of operating data indicative of temperature. Furthermore, the operations of FIG. 10 may be equally applicable to operating data as described in reference to FIG. 9.

FIGS. 9-10 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. A power combiner comprising:

a plurality of power input structures, wherein each of the plurality of power input structures defines a waveguide configured to receive a respective electromagnetic radiation input from a respective power source; and a central combining conduit configured to:

receive the respective electromagnetic radiation inputs communicated via respective power input structures; and combine the respective electromagnetic radiation inputs into a combined power signal for output via an output port communicably coupled with the central combining conduit, wherein the central combining conduit defines a waveguide structure that is configured to minimize insertion loss between the respective electromagnetic radiation inputs and the combined power signal; and wherein the central combining conduit has a first end adjacent the plurality of power input structures, the first end defining a first step away from the first end and toward an opposite second end.

2. The power combiner according to claim 1, wherein each of the plurality of power input structures comprises a body defining:

a first end configured to receive the respective electromagnetic radiation input from the respective power source;

a second end opposite the first end configured to couple the respective power input structure to the central combining conduit; and the waveguide extending therebetween.

3. The power combiner according to claim 2, wherein each of the plurality of power input structures tapers along a length of the respective body from the first end to the second end.

4. The power combiner according to claim 2, wherein each of the plurality of power input structures defines a first cross-sectional area proximate the first end and a second cross-sectional area proximate the second end, wherein the first cross-sectional area is greater than the second cross-sectional area.

5. The power combiner according to claim 2, further comprising a plurality of solid-state power inputs, each of which is coupled to a respective one of the plurality of power input structures.

6. The power combiner according to claim 5, wherein each of the plurality of solid-state power inputs are removably attached to respective first ends of the respective power input structures.

7. The power combiner according to claim 1, wherein the central combining conduit is dimensioned so as to reduce or substantially prevent back reflection of the electromagnetic radiation inputs received from the plurality of power input structures.

8. The power combiner according to claim 1, wherein the central combining conduit defines a circular cross-sectional shape such that each of the power input structures are positioned circumferentially around the central combining conduit and extend radially outward from the central combining conduit.

9. The power combiner according to claim 8, where a diameter of the central combining conduit is configured to reduce or substantially prevent back reflection of the electromagnetic radiation inputs received from the plurality of power input structures.

10. The power combiner according to claim 1, wherein the electromagnetic radiation inputs received from the plurality of power input structures moves through the central combining conduit substantially unimpeded.

11. The power combiner according to claim 1, wherein the central combining conduit consists of the waveguide structure.

12. The power combiner according to claim 1, wherein the central combining conduit combines the electromagnetic radiation inputs in the absence of a tuning element.

13. The power combiner according to claim 1, wherein the plurality of power input structures are formed integral to the central combining conduit.

14. The power combiner according to claim 1, wherein a bandwidth of the combined power signal output by the power combiner may be at least 16% of the sum of a parameter bandwidth of the electromagnetic radiation inputs.

15. The power combiner according to claim 1, wherein the first end further defines a second step within the first step, away from the first end and toward the opposite second end.

16. A method of manufacturing a power combiner, the method comprising:

providing a plurality of power input structures, wherein each of the plurality of power input structures defines a waveguide configured to receive a respective electromagnetic radiation input from a respective power source; and providing a central combining conduit configured to:

receive the respective electromagnetic radiation inputs communicated via respective power input structures; and combine the respective electromagnetic radiation inputs into a combined power signal for output via an output port communicably coupled with the central combining conduit, wherein the central combining conduit defines a waveguide structure that is configured to minimize insertion loss between the respective electromagnetic radiation inputs and the combined power signal; and wherein the central combining conduit has a first end adjacent the plurality of power input structures, the first end defining a first step away from the first end and toward an opposite second end.

17. The method according to claim 16, wherein providing the central combining conduit further comprises dimensioning the central combining conduit so as to reduce or substantially prevent back reflection of the electromagnetic radiation inputs received from the plurality of power input structures.

18. The method according to claim 16, wherein providing the central combining conduit further comprises defining a circular cross-sectional shape of the central combining conduit such that each of the power input structures are positioned circumferentially around the central combining conduit and extend radially outward from the central combining conduit.

19. The method according to claim 18, where a diameter of the central combining conduit is configured to reduce or substantially prevent back reflection of the electromagnetic radiation inputs received from the plurality of power input structures.

20. The method according to claim 16, wherein the electromagnetic radiation inputs received from the plurality of power input structures moves through the central combining conduit substantially unimpeded.

* * * * *